US009720881B2

(12) United States Patent
Schein et al.

(10) Patent No.: US 9,720,881 B2
(45) Date of Patent: *Aug. 1, 2017

(54) CONVEX EQUILATERAL POLYHEDRA WITH POLYHEDRAL SYMMETRY

(71) Applicant: The Regents of the University of California, Oakland, CA (US)

(72) Inventors: Stanley Jay Schein, Santa Monica, CA (US); James Maurice Gayed, Santa Monica, CA (US)

(73) Assignee: The Regents of the University of California, Oakland, CA (US)

(*) Notice: Subject to any disclaimer, the term of this patent is extended or adjusted under 35 U.S.C. 154(b) by 265 days.

This patent is subject to a terminal disclaimer.

(21) Appl. No.: 14/446,149

(22) Filed: Jul. 29, 2014

(65) Prior Publication Data

US 2015/0037766 A1 Feb. 5, 2015

Related U.S. Application Data

(60) Provisional application No. 61/861,960, filed on Aug. 2, 2013.

(51) Int. Cl.
*E04B 1/32* (2006.01)
*G09B 23/04* (2006.01)
(Continued)

(52) U.S. Cl.
CPC ............. *G06F 17/10* (2013.01); *G09B 23/04* (2013.01); *E04B 1/32* (2013.01); *E04B 1/3211* (2013.01); *G09B 25/04* (2013.01); *G09B 27/08* (2013.01)

(58) Field of Classification Search
CPC .. E04B 1/32; E04B 1/3211; E04B 2001/3223; E04B 2001/3282;
(Continued)

(56) References Cited

U.S. PATENT DOCUMENTS 3,998,004 A * 12/1976 Ehrlich ................ A63H 33/046
428/900
4,611,441 A 9/1986 Wickens
(Continued)

OTHER PUBLICATIONS

Agirrezabala, X., et al., "Quasi-Atomic Model of Bacteriophage T7 Procapsid Shell: Insights Into the Structure and Evolution of a Basic Fold," Structure 15:461-472, Apr. 2007.
(Continued)

*Primary Examiner* — Phi A
(74) *Attorney, Agent, or Firm* — Christensen O'Connor Johnson Kindness PLLC

(57) ABSTRACT

A new class of polyhedron is constructed by decorating each of the triangular facets of an icosahedron with the T vertices and connecting edges of a "Goldberg triangle." A unique set of internal angles in each planar face of each new polyhedron is then obtained, for example by solving a system of n equations and n variables, where the equations set the dihedral angle discrepancy about different types of edge to zero, where the independent variables are a subset of the internal angles in 6 gons. Alternatively, an iterative method that solves for angles within each hexagonal ring may be solved for that nulls dihedral angle discrepancy throughout the polyhedron. The 6 gon faces in the resulting "Goldberg polyhedra" are equilateral and planar, but not equiangular, and nearly spherical.

15 Claims, 7 Drawing Sheets

(51) Int. Cl.
G06F 17/10 (2006.01)
G09B 27/08 (2006.01)
G09B 25/04 (2006.01)
(58) Field of Classification Search
CPC ........ G09B 23/04; G09B 25/04; G09B 27/08; G09B 23/10; G09B 27/00
USPC .............................. 52/80.1, 80.2, 81.1, 81.3
See application file for complete search history.

(56) References Cited

U.S. PATENT DOCUMENTS

| | | | |
|---|---|---|---|
| 4,729,197 A | 3/1988 | Miller | |
| 6,282,849 B1* | 9/2001 | Tuczek | E04B 1/32 52/648.1 |
| 6,295,785 B1* | 10/2001 | Herrmann | E04B 1/3211 52/639 |
| 6,988,969 B2* | 1/2006 | Avis | A63B 41/08 473/599 |
| 7,316,197 B2* | 1/2008 | Herrmann | B63B 3/13 114/312 |
| 7,686,616 B1* | 3/2010 | Cloud | G09B 27/08 434/137 |
| 8,347,561 B2 | 1/2013 | Howe | |
| 8,365,474 B2* | 2/2013 | McSweeney | E04B 1/3211 52/81.1 |
| 8,464,476 B2* | 6/2013 | Roberts | E02B 3/04 446/102 |
| 8,789,318 B1* | 7/2014 | Sun | E04B 1/3211 52/81.1 |
| 2002/0078635 A1* | 6/2002 | Monson | E04B 1/3211 52/81.1 |
| 2003/0203779 A1* | 10/2003 | Avis | A63B 41/08 473/604 |
| 2007/0163185 A1* | 7/2007 | Morley | E04B 1/3205 52/81.1 |

OTHER PUBLICATIONS

Baker, T.S., et al., "Adding the Third Dimension to Virus Life Cycles: Three-Dimensional Reconstruction of Icosahedral Viruses From Cryo-Electron Micrographs," Microbiology and Molecular Biology Reviews 63(4):862-922, Dec. 1999.
Caspar, D.L.D., "Deltahedral Views of Fullerene Polymorphism," Philosophical Transactions: Physical Sciences and Engineering 343(1667):133-144, Apr. 1993.
Caspar, D.L.D., and A. Klug, "Physical Principles in the Construction of Regular Viruses," Cold Spring Harbor Symposia on Quantitative Biology 27:1-24, 1962.
Chen, D.-H., et al., "Structural Basis for Scaffolding-Mediated Assembly and Maturation of a dsDNA Virus," Proceedings of the National Academy of Sciences (PNAS) 108(4):1355-1360, Jan. 2011.
Cheng, Y., et al., "Cryo-Electron Tomography of Clathrin Coated Vesicles: Structural Implications for Coat Assembly," Journal of Molecular Biology 365(3):892-899, Jan. 2007 (Author Manuscript provided, PMCID:PMC1839968, available in PMC Jan. 19, 2008, 16 pages).
Crowther, R.A., et al., "On the Structure of Coated Vesicles," Journal of Molecular Biology 103(4):785-798, Jun. 1976.
Evilevitch, A., et al., "Osmotic Pressure Inhibition of DNA Ejection From Phage," Proceedings of the National Academy of Sciences (PNAS)100(16):9292-9295, Aug. 2003.
Fokine, A., et al., "Structural and Functional Similarities Between the Capsid Proteins of Bacteriophages T4 and HK97 Point to a Common Ancestry," Proceedings of the National Academy of Sciences (PNAS) 102(20):7163-7168, May 2005.
Ford, G.C., et al., "Ferritin: Design and Formation of an Iron-Storage Molecule," Philosophical Transactions of the Royal Society of London, Series B, Biological Sciences 304(1121):551-565, Feb. 1984.
Gelbart, W.M., and C.M. Knobler, "Virology: Pressurized Viruses," Science 323(5922):1682-1683, Mar. 2009.
Gertsman, I. et al., "An Unexpected Twist in Viral Capsid Maturation," Nature 458(7238):646-650, Apr. 2009 (Author Manuscript provided, PMCID:PMC2765791, available in PMC Oct. 22, 2009, 11 pages).
Goldberg, M., "A Class of Multi-Symmetric Polyhedra," Tôhoku Mathematical Journal 43:104-108,1937.
Goldberg, M., "Unstable Polyhedral Structures," 51(3):165-170, Mathematics Magazine, May 1978.
Heymann, J.B., et al., "Dynamics of Herpes Simplex Virus Capsid Maturation Visualized by Time-Lapse Cryo-Electron Microscopy," Nature, Structural Biology 10(5):334-341, May 2003.
Jiang, W., et al., "Coat Protein Fold and Maturation Transition of Bacteriophage P22 Seen at Subnanometer Resolutions," Nature Structural Biology 10(2):131-135, Feb. 2003.
Johnson, N.W., "Convex Polyhedra With Regular Faces," Canadian Journal of Mathematics 18:169-200, 1966.
Kroto, H.W., "The Stability of the Fullerenes C(n), With n = 24,28,32,36,50,60 and 70," Nature 329(6139): 529-531, Oct. 1987.
Kroto, H.W., et al., "C(60): Buckminsterfullerene," Nature 318(6042):162-163, Nov. 1985.
Morais, M.C., et al., "Conservation of the Capsid Structure in Tailed dsDNA Bacteriophages: The Pseudoatomic Structure of Φ29," Molecular Cell 18(2):149-159, Apr. 2005.
Pawley, G.S., "Plane Groups on Polyhedra," Acta Crystallographica 15(1):49-53, Jan. 1962.
Pettersen, E.F., et al., "UCSF Chimera—A Visualization System for Exploratory Research and Analysis," Journal of Computational Chemistry 25(13):1605-1612, 2004.
Schein, S., "Architecture of Clathrin Fullerene Cages Reflects a Geometric Constraint—the Head-to-Tail Exclusion Rule—and a Preference for Asymmetry," Journal of Molecular Biology 387(2):363-375, Mar. 2009.
Schein, S., and J.M. Gayed, "Fourth Class of Convex Equilateral Polyhedron With Polyhedral Symmetry Related to Fullerenes and Viruses," Proceedings of the National Academy of Sciences (PNAS) 111(8):2920-2925, Feb. 2014.
Schein, S., and M. Sands-Kidner, "A Geometric Principle May Guide Self-Assembly of Fullerene Cages From Clathrin Triskelia and From Carbon Atoms," Biophysical Journal 94(3):958-976, Feb. 2008.
Schein, S., and T. Friedrich, "A Geometric Constraint, the Head-to-Tail Exclusion Rule, May Be the Basis for the Isolated-Pentagon Rule in Fullerenes With More Than 60 Vertices," Proceedings of the National Academy of Sciences (PNAS) 105(49):19142-19147, Dec. 2008.
Schein, S., et al., "The Physical Basis for the Head-to-Tail Rule That Excludes Most Fullerene Cages From Self-Assembly," Biophysical Journal 94(3):938-957, Feb. 2008.
Schmalz, T.G., et al., "Elemental Carbon Cages," Journal of the American Chemical Society 110(4):1113-1127, Feb. 1988.
Smith, D.E., et al., "The Bacteriophage Φ29 Portal Motor Can Package DNA Against a Large Internal Force," Nature 413(6857):748-752, Oct. 2001.
Smith, J.M.A., et al., "A Molecular Model for the Quaternary Structure of Ferritin," Journal of Chemical Education 65(12):1083-1084, Dec. 1988.
Vanhoenacker, M., "Digital Globes Offer a Dynamic Vision," The New York Times, Jan. 7, 2013.

* cited by examiner

CONVEX EQUILATERAL POLYHEDRA WITH POLYHEDRAL SYMMETRY

CROSS-REFERENCE TO RELATED APPLICATION

This application claims benefit of U.S. Provisional Patent Application No. 61/861,960 filed Aug. 2, 2013, the disclosure of which is hereby incorporated by reference in its entirety.

BACKGROUND

Description and classification of geometric forms have occupied mathematical thinkers since ancient times. The Greeks discovered the five Platonic polyhedra (tetrahedron, cube or hexahedron, octahedron, dodecahedron, and icosahedron) and the thirteen Archimedean polyhedra, all with regular (i.e., equiangular and equilateral) faces. Kepler, who rediscovered the Archimedean polyhedra, discovered two rhombic polyhedra, including the rhombic dodecahedron that resembles ferritin cages. These three classes of polyhedra represent all of the equilateral convex polyhedra with polyhedral symmetry, i.e., icosahedral, octahedral and tetrahedral symmetry. For example, none of the well-known face-regular Johnson solids have polyhedral symmetry.

In a paper titled "A class of multi-symmetric polyhedral," published in the Tohoku Mathematical Journal 43:104-108 (1937), which is hereby incorporated by reference, the mathematician Michael Goldberg disclosed a novel method for constructing cages with tetrahedral, octahedral, and icosahedral symmetry.

A method for constructing a Goldberg cage is illustrated in FIGS. 1A-1F. First a "Goldberg triangle" is constructed or selected. For example, an equilateral triangle is drawn or positioned on a tiling of hexagons with the vertices of the triangle on the centers of hexagons in the tiling. Examples of suitable Goldberg triangles are shown in FIGS. 1A-1C, wherein the vertices from the tiling that are enclosed by the triangle are shown with a solid circle and vertices that the triangle overlies are shown with a half-filled circle. One edge of the triangle is herein referred to as the "base line segment."

In general, the base line segment spans h tiles in the horizontal direction (in FIGS. 1A-1C) and k tiles in a direction 60 degrees from horizontal. For example, in the three examples shown in FIG. 1A the base line segment spans h=1, h=2, and h=3 tiles respectively in the horizontal direction, and zero tiles in the 60 degrees direction. In FIG. 1B (left) the base line segment spans h=1 tile in the horizontal direction and k=1 tile in the 60 degree direction. In FIG. 1B (right) the base line segment spans h=2 tiles in the horizontal direction and k=2 tiles in the 60 degree direction. In FIG. 1C (left) the base line segment spans h=2 tiles in the horizontal direction, and k=1 tile in the 60 degree direction. In FIG. 1C (right) the base line segment spans h=3 tiles in the horizontal direction, and k=1 tile in the 60 degree direction.

A Goldberg triangle encloses T vertices (vertices the triangle overlies are counted as ½ an enclosed vertex), where:

$$T = h^2 + hk + k^2 \qquad (1)$$

In FIGS. 1A-1C the figures are labeled with the number of enclosed vertices, T and the (h,k) parameters. Goldberg triangles can be grouped into three different types: (i) the (h,0) group, i.e., k=0 (exemplary embodiments shown in FIG. 1A for T=1, 4 and 9), (ii) the (h=k) group (exemplary embodiments shown in FIG. 1B for T=3 and 12), and (iii) the (h≠k) group (exemplary embodiments shown in FIG. 1C, with T=7 and 13). A triangular patch is then generated from the constructed triangle. For example, FIG. 1D shows the triangular patch 80 for the Goldberg triangle having T=9 vertices with (h,k)=(3,0).

Each triangular facet of a regular tetrahedron, octahedron, or icosahedron is then decorated with the selected Goldberg triangle. FIG. 1E (left) shows the Goldberg triangle 80 on the faces of a tetrahedron 82, FIG. 1E (center) shows the Goldberg triangle 80 on the faces of an octahedron 84, and FIG. 1E (right) shows the Goldberg triangle 80 on the faces of an icosahedron 86. Finally edges 81 are added that connect vertices across the boundaries of the faces, as illustrated for each of these polyhedral in FIG. 1F.

The resulting tetrahedral cage has 4 T trivalent vertices, sixteen 6 gonal faces, and four triangular faces. The resulting octahedral cage has 8 T trivalent vertices, thirty-two 6 gonal faces, and six square corner faces. The resulting icosahedral cage has 20 T trivalent vertices, eighty hexagonal faces, and twelve pentagonal faces. However, with unequal edge lengths, these cages are not equilateral. With nonplanar faces these cages are not polyhedra and thus not convex.

For T=1 and T=3 we can transform these cages such that all edge lengths are equal and all interior angles in the hexagons are equal. For T=1 this method produces three of the Platonic solids: the tetrahedron, the cube, and the dodecahedron. For T=3, this method produces three of the Archimedean solids: the truncated tetrahedron, the truncated octahedron, and the truncated icosahedron. These cages are geometrically polyhedral because their faces are planar. They are also convex.

Can similar symmetric convex equilateral polyhedra be created from Goldberg triangles for T>3? The present inventors have proven that no such polyhedra are possible if the transformation also requires equiangularity. Even if the transformation does not enforce equiangularity, the resulting "merely equilateral" cages would typically have nonplanar hexagonal faces, and therefore are not polyhedral. Moreover, the nonplanar hexagons defined by the cages are either "boat" shaped or "chair" shaped, and therefore the cages are not convex.

The present inventors found that the difference—convex polyhedral cages with planar hexagons for T=1 and T=3, but non-polyhedral cages with nonplanar faces for T>3—is due to the presence of edges with dihedral angle discrepancy ("DAD"), which is discussed in more detail herein. However, surprisingly the inventors discovered that it is possible to null all of the DADs and thus to create an entirely new class of equilateral convex polyhedra with polyhedral symmetry that we call "Goldberg polyhedra."

The resulting Goldberg polyhedra and corresponding Goldberg cages may be used, for example, to construct an efficient and nearly spherical framework or dome for enclosing space wherein the edges or struts of the framework are of equal length. Near-spherical convex, equilateral polyhedral structures, and methods for designing such structures, are disclosed that are suitable for enclosing a space, including, for example, a living space, a storage space, a utility space, or the like. The new equilateral cages and/or Goldberg polyhedra may also be used for other purposes such as a providing nearly spherical (e.g., hemispherical, spherical sections, or the like) constructs that may be used as supports. An advantage of such structures is the equilaterality. For example, an equilateral cage will have struts that are all of equal length, so the struts may be fully interchangeable, thereby simplifying manufacture and assembly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is disclosed for generating a new class of convex equilateral polyhedra, or portions thereof, that are useful for enclosing a space, for example, for a dome structure having equilateral struts.

A method for designing a convex equilateral cage structure includes selecting a Goldberg triangle, decorating the faces of an icosahedron with the selected triangle, and adding connecting segments that connect corresponding vertices across adjacent Goldberg triangles to initially define a non-polyhedral cage comprising trivalent vertices. The non-polyhedral cage is then transformed such that the cage comprises a plurality of hexagons and pentagons, and the cage is equilateral and convex.

In a current embodiment the step of transforming the non-polyhedral cage comprises solving for a set of interior angles in the hexagons that produce a zero dihedral angle discrepancy (DAD) throughout the cage. For example, the set of interior angles may be solved for by identifying all independent interior angles in the cage and solving a system of equations that enforce planarity in the plurality of hexagons. Another example of a method to achieve a polyhedral solution is to reduce the dihedral angles within each of the hexagonal and pentagonal ring to zero. This is the method used in the chemistry software discussed above. It will be appreciated that this differs from solving a system of zero-DAD equations.

In a current embodiment the selected Goldberg triangle includes at least four vertices from the hexagonal tiling used to generate the Goldberg triangle.

In a current embodiment the method includes the construction of a convex equilateral cage by interconnecting a plurality of struts to form the cage, wherein the struts are interchangeable.

In a current embodiment the method includes the construction of a convex equilateral cage by interconnecting a plurality of planar members that define the plurality of hexagons and pentagons.

In a current embodiment the convex equilateral cage structure comprises a dome.

In a current embodiment the convex equilateral cage structure has tetrahedral, octahedral, and icosahedral symmetry.

In another aspect of the present invention, a new convex equilateral nearly spherical cage is disclosed having a plurality of interconnected elongate members that define regular pentagons and a plurality of hexagons, wherein at least some of the plurality of hexagons are not equiangular.

In a current embodiment the DADs through the cage are zero. For example, the cage may comprise a plurality of elongate, interchangeable struts. In another example, the cage comprises a plurality of hexagonal and pentagonal plates.

In a current embodiment the convex equilateral cage has tetrahedral, octahedral, and icosahedral symmetry.

In another aspect of the present invention a method is disclosed for designing a nearly spherical equilateral cage that includes selecting a Goldberg triangle, forming an icosahedron from twenty of the selected Goldberg triangle, forming a preliminary cage by adding segments that connect vertices across adjacent faces, and transforming the preliminary cage by setting all of the segments to the same length and setting interior angles in the hexagons to angles that null the DADs throughout the cage, forming a cage defining a plurality of planar hexagons and a plurality of planar pentagons.

In a current embodiment the selected Goldberg triangle includes at least four vertices.

In a current embodiment the interior angles are determined by identifying all independent interior angles and solving a system of equations that enforce planarity in the hexagons.

In a current embodiment a framework is provided that is designed in accordance with this method.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C illustrate the various types of Goldberg triangles that comprise an equilateral triangle with corners disposed on the centers of selected hexagons in a hexagonal tiling, wherein FIG. 1A illustrates three (h,0) Goldberg triangles, FIG. 1B illustrates two (h=k) Goldberg triangles, and FIG. 1C illustrates two (h≠k) Goldberg triangles;

DETAILED DESCRIPTION

I. Dihedral Angle Discrepancy (DAD)

Figure 1A:
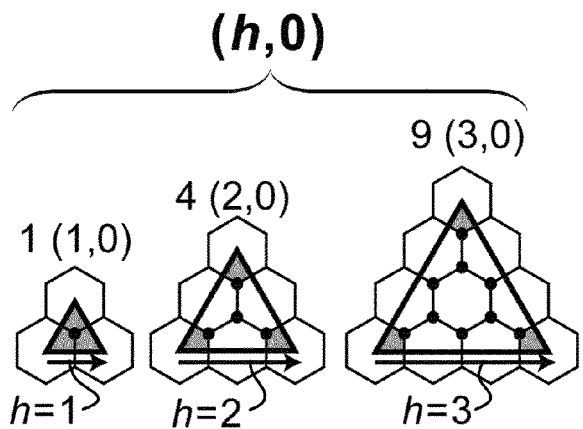
Figure 1B:
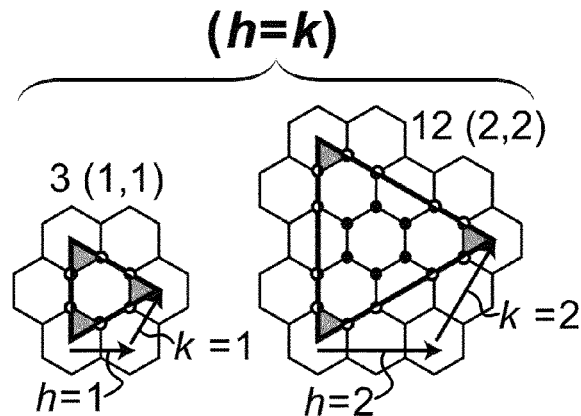
Figure 1C:
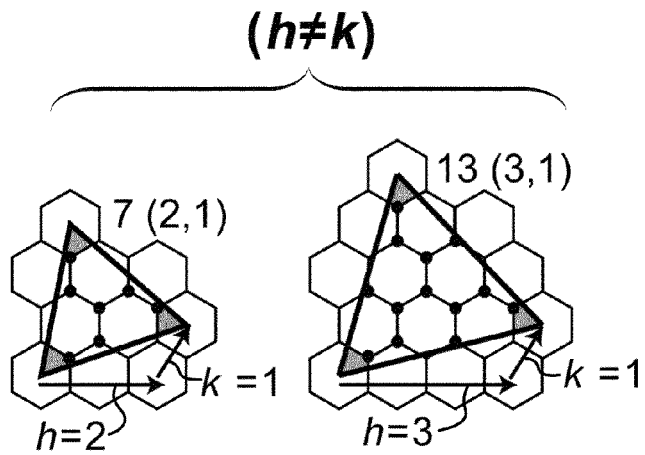
Figure 1E:
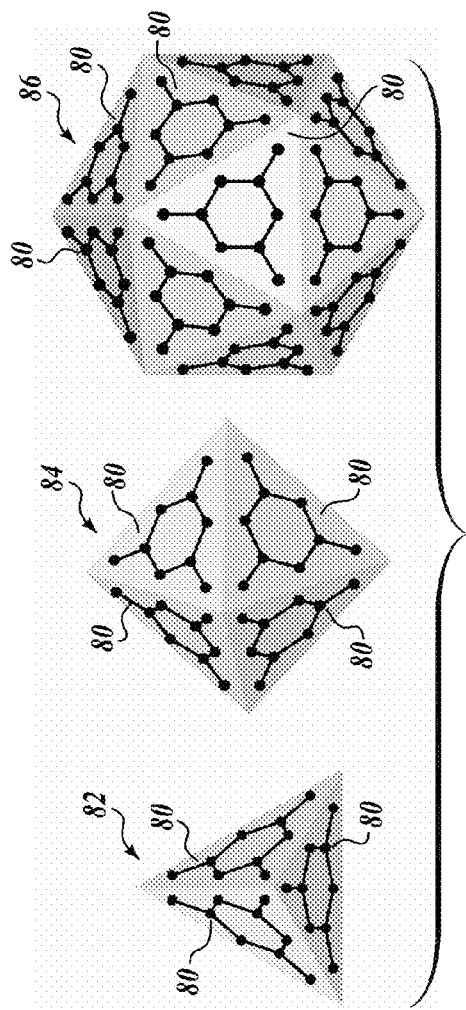
FIG. 1E illustrates the Goldberg triangle from FIG. 1D applied to the triangular faces of a tetrahedron, an octahedron, and an icosahedron.
Figure 1F:
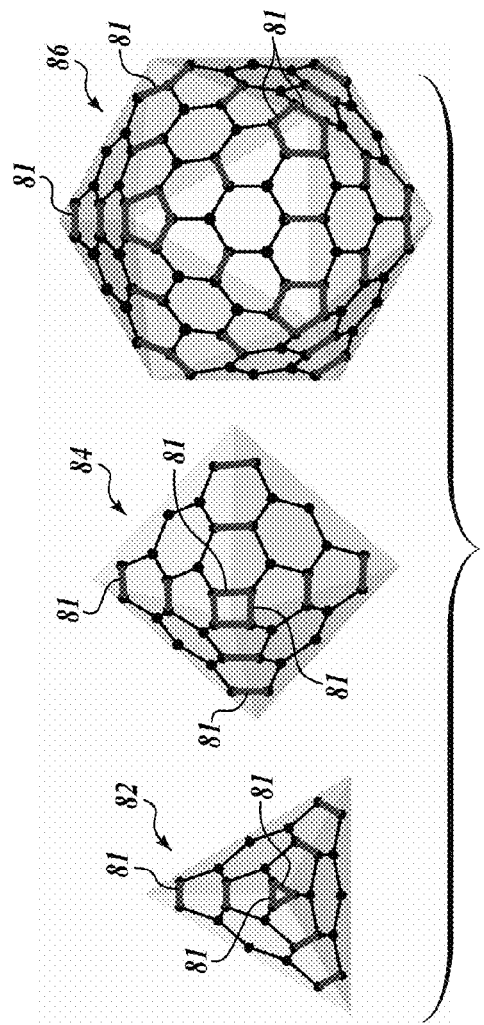
FIG. 1F illustrates a final step in constructing a Goldberg cage comprising the addition of connecting edges across boundaries of the faces of the polyhedron shown in FIG. 1E to form a cage.
Figure 1D:
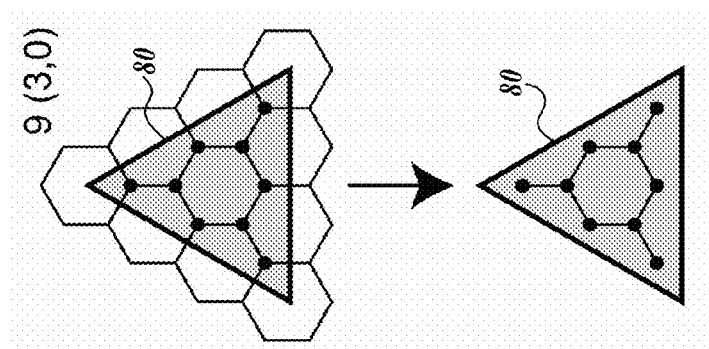
FIG. 1D illustrates an exemplary Goldberg triangle equilateral patch.
Figure 2A:
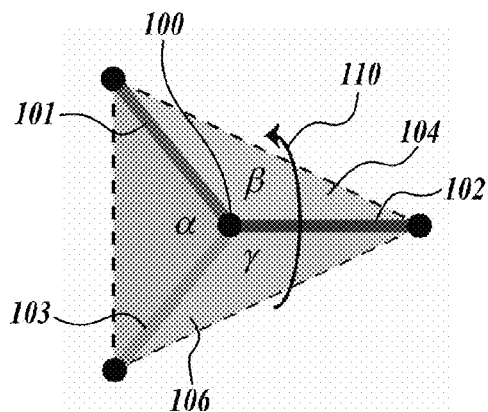
FIG. 2A illustrates the definition of a dihedral angle.

To understand dihedral angle discrepancy, consider the trivalent vertex 100 shown in FIG. 2A, wherein the vertex 100 is defined by three edges 101, 102, 103 that are not coplanar. In FIG. 2A the dihedral angle (DA) 110 about edge 102 is the angle between the two flanking planes 104 and 106. Plane 104 is defined by edges 101 and 102, and plane 106 is defined by edges 103 and 102. For the trivalent vertex 100, the cosine of the DA 110 may be calculated from end-angle $\alpha$ and side angles $\beta$ and $\gamma$ as shown in Eq. 2:

$$\cos(DA) = \frac{\cos(\alpha) - \cos(\beta) \times \cos(\gamma)}{\sin(\beta) \times \sin(\gamma)} \quad (2)$$

It should be appreciated that in Eq. 2 the angles $\beta$ and $\gamma$ are interchangeable.

Figure 2B:
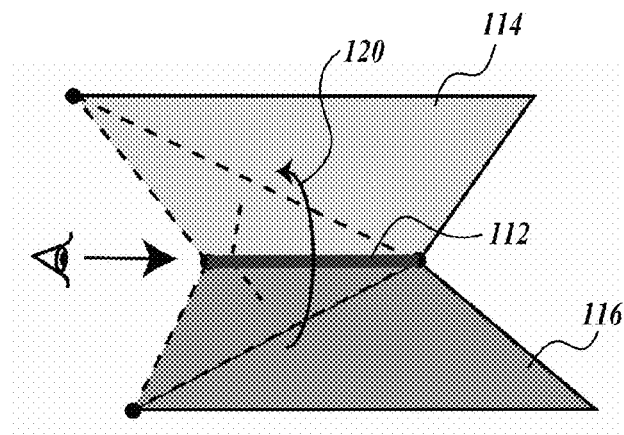
FIGS. 2B and 2C illustrate the dihedral angle about an edge joining two 4 gons as viewed from the left end of the edge (FIG. 2B) and from the right end of the edge (FIG. 2C)
Figure 2C:
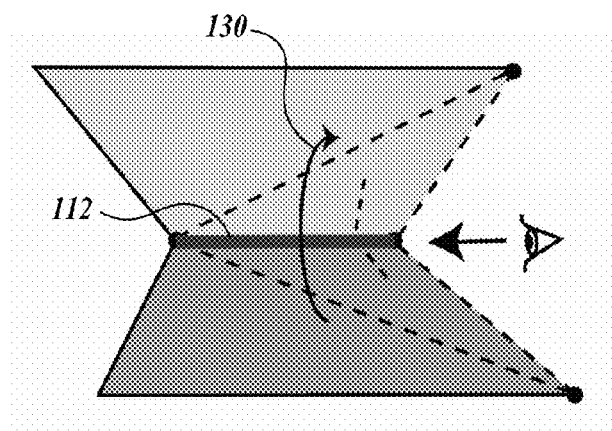

FIGS. 2B and 2C illustrate an edge 112 flanked by two 4 gons 114 and 116. It will be clear from the FIGURES that if the 4 gons 114 and 116 are planar, the dihedral angle 120 about the edge 112 when viewed from the left end (FIG. 2B) must be the same as the dihedral angle 130 when viewed from the right end (FIG. 2C). If the dihedral angles 120 and 130 are not the same, then one or both of the 4 gons 114, 116 are not planar.

Figure 2D:
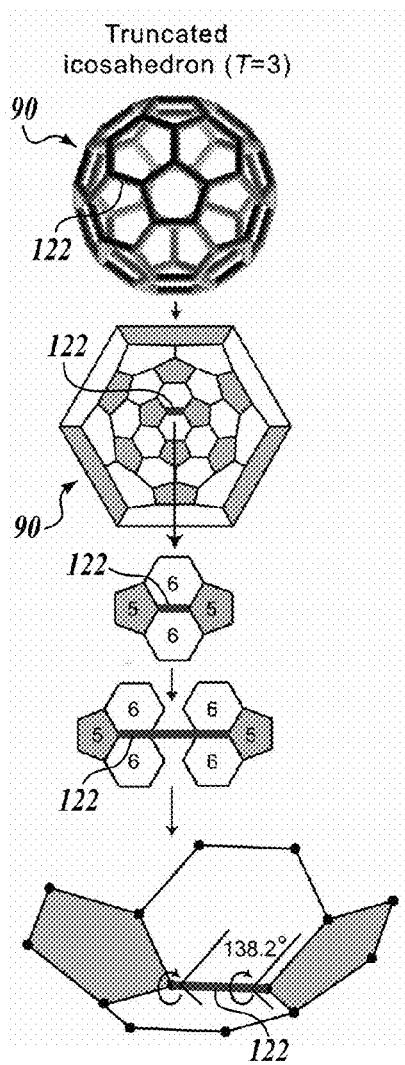
FIG. 2D illustrates the dihedral angles about either end of an edge joining two 566 vertices from a truncated icosahedron (in conventional nomenclature, a 566 vertex is a trivalent vertex formed by a 5 gon and two 6 gons arranged sequentially)

Now consider the truncated icosahedral cage 90 shown in FIG. 2D (top). A truncated icosahedron is an Archimedean solid having 12 regular (equilateral, equiangular) pentagonal faces and 20 regular hexagonal faces. An edge 122 extends from a 5 gon at a 566 vertex ($\alpha$=108° for the regular pentagon, $\beta$=$\gamma$=120° for the regular hexagons) to another 5 gon on the left side, also at a 566 vertex ($\alpha$=108°, $\beta$=$\gamma$=120°). Therefore, from Eq. 2 the edge 122 has dihedral angles that are the same 138.2° at the both ends. (In conventional nomenclature, a 566 vertex is a trivalent vertex formed by a 5 gon, and two 6 gons arranged sequentially.)

Figure 2E:
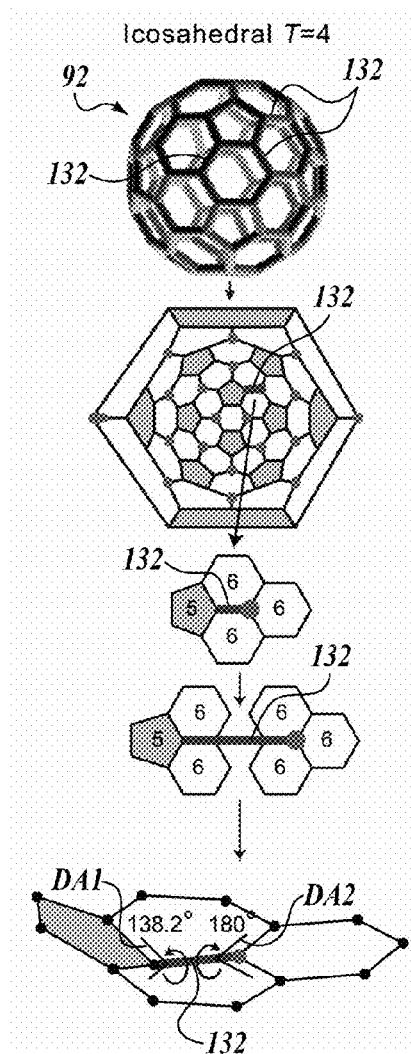
FIG. 2E illustrates the dihedral angles about either end of an edge joining a 566 vertex and a 666 vertex, wherein there is a dihedral angle discrepancy.

By contrast, in the icosahedral T=4 cage 92 shown in FIG. 2E (top) each of the spokes or edges 132 extending from any 5 gon connects a 566 vertex to a 666 vertex. If the 6 gons are regular and planar, they have internal angles of 120°. Therefore, according to Eq. 2 the dihedral angle DA1 about the 566 end (with $\alpha$=108°, $\beta$=$\gamma$=120°) is 138.2°, but the dihedral angle DA2 about the 666 end (with $\alpha$=$\beta$=$\gamma$=120°) is 180°. The difference or dihedral angle discrepancy (DAD) is 41.8°. Therefore, one or both of the 6 gons flanking the edge 132 are nonplanar. With nonplanar faces flanking all of the 5 gon spoke edges, this T=4 cage is not a polyhedron. (We note that nonplanar 6 gons have internal angles that sum to less than 720° and cannot all be equal, but non-planar faces also mean that the cage is not polyhedral.)

All Goldberg cages with T≥4 have edges radiating from corner faces to 666 vertices. All Goldberg cages include edges having DADs, and are therefore non-polyhedral. This situation obtains for the achiral (h,0 and h=k) and chiral (h≠k) cages.

II. Nulling DADs

As discussed above, conventional Goldberg cages for T>3 produce nonplanar 6 gons, and are therefore non-polyhedral. The present inventors have proven that the Goldberg cages cannot be transformed to produce polyhedral cages in any transformation that requires both equilaterality and equiangularity.

We then ask if a Goldberg cage for T>3 can be transformed into a convex polyhedral cage using a method that abandons the requirement for equiangularity in the 6 gons, but maintains equilateral edges, i.e., is there a set of internal angles in the 6 gons that would null the DADs about spoke edges and produce planar faces flanking those edges? Symmetry requires the corner faces—3 gons, 4 gons, or 5 gons—to be regular and thus equiangular. For example, the DAD about the spoke edge 132 in FIG. 2E would be zero if dihedral angle (DA1) on the 566 end of the edge 132 were equal to the dihedral angle (DA2) on the 666 end of the edge 132:

$$DA1-DA2=0 \quad (3)$$

For example, if the internal angles are 60°, 135° and 135° at one end of the edge 132, and 90°, 90°, and 90° at the other end, both dihedral angles DA1 and DA2 would be 90° and the DAD would be zero. We note that the internal angle labels at either end of the edge (i.e., 566 and 666) are different, so the edge would still be a "DAD edge."

Our first challenge is to discover for cages with T≥4 whether it is possible to find a set of internal angles in the 6 gons that null all of the DADs in a cage—including the spoke edges—and thus make all of the faces planar. Our second challenge is to determine those internal angles.

III. Labeling 6 gons and Internal Angles

We begin by identifying each symmetry-equivalent 6 gon in the Goldberg triangles. For example, in FIG. 3A a T=4 (2,0) Goldberg triangle 140 involves three 6 gons 142. All of the three 6 gons 142 are symmetry-equivalent, with angles "a" and "b" as indicated. The corner portions 144 define regular 3 gon, 4 gon, or 5 gon, which are constrained to be regular (equilateral, equiangular) polygons. Therefore, the T=4 (2,0) Goldberg triangle 140 has one 6 gon type 142, and one type of DAD edge 146.

Figure 3B:
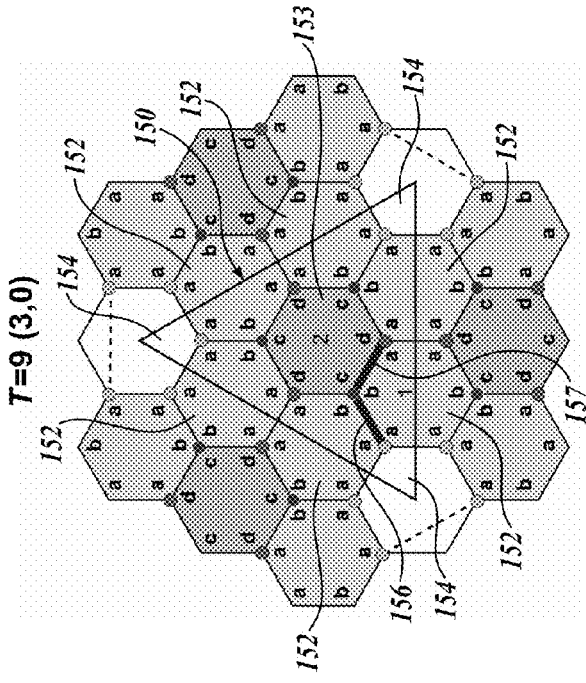
FIG. 3B illustrates a T=9(3,0) Goldberg triangle, showing angle labels (a, b, c, and d), and having three types of DAD edges, wherein one of each type of DAD edge is shown in bold.

Similarly, in FIG. 3B a T=9 (3,0) Goldberg triangle 150 involves six symmetry-equivalent peripheral 6 gons 152, one interior 6 gon 153, and end portions 154, with angles "a", "b", "c", and "d" as indicated. Therefore, the T=9 (3,0) Goldberg triangle 150 has two 6 gon types 152 and 153, and two types of DAD edges 156, 157.

Figure 3A:
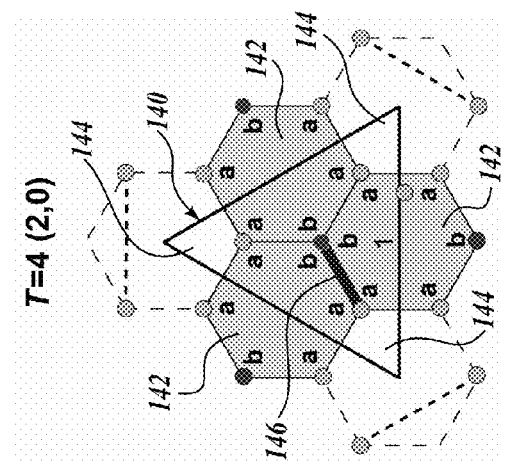
FIG. 3A illustrates a T=4 (2,0) Goldberg triangle, showing angle labels (a and b), and having only one type of DAD edge, one of which is shown in bold.
Figure 3C:
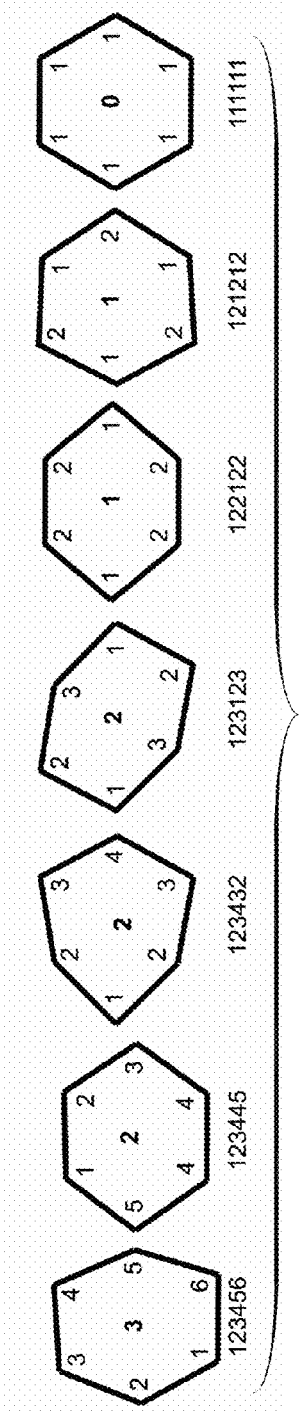
FIG. 3C illustrates the seven different types of planar equilateral 6 gons, with angle labels showing the different patterns of internal angles, and the corresponding number of independent variables noted in the center of each 6 gon.

Planar equilateral 6 gons can appear with seven different patterns of internal angles, which are illustrated with labels in FIG. 3C. For example, the type with six different internal angles 123456 has three independent variables, as marked in the center of that 6 gon. Conversely, in a regular 6 gon the angles are all 120°, and so there is no independent variable.

Based on the taxonomy of planar equilateral 6 gons and symmetry, we label the internal angles in the 6 gons of Goldberg triangles. For each group of Goldberg triangles (h,0, h=k, and h≠k), the number of unique internal angles increases with T.

A more detailed discussion of the different patterns of internal angles is provided in the priority U.S. Provisional Patent Application No. 61/861,960, which is incorporated by reference above.

IV. Numbers of Variables and Equations

The number of independent variables in a planar equilateral n-gon with all different internal angles is n−3, thus 3 independent variables are required for a 6 gon with the 123456 pattern (FIG. 3C). However, a planar equilateral n-gon constrained by symmetry has fewer independent variables. For example, the six other types of 6 gon in FIG. 3C have from 0 to 2 independent variables, as marked in the center of each 6 gon.

For each Goldberg triangle, we identify each 6 gon's type and corresponding number of independent variables. For the equilateral cages we examined, the total number of independent variables ranged from 1 (FIG. 3A) to 18. For each of the three groups of cage (achiral (h,0), (h=k), and chiral (h≠k)), as T increases, the number of independent variables increases.

By definition, any edge with a vertex type (e.g., 566, 666, etc.) on one end that is different from the vertex type at the edge's opposite end is a DAD edge. In FIGS. 3A and 3B one example of each different type of DAD edge in each Goldberg triangle is marked as a thick black edge (i.e., 146, 156, and 157). Each unique type of DAD edge provides its own "zero-DAD" equation, corresponding to Eq. 3. Conversely, in general an edge with the same vertex types at its two ends is not a DAD edge. However, two exceptions arise only in chiral h≠k cages. These exceptions are due to different arrangements of the same three internal angles at their ends.

As shown above, a cage will have all planar faces only if all of the DADs in the cage are zero. Therefore, for a given cage, we compare the number of different types of DAD edge—hence the number of zero-DAD equations—with the number of independent variables. To our astonishment, for all of the cages we studied, even for chiral cages, the number of different DAD equations and the number of independent variables are equal. We take this to be the general rule. Therefore, for each equilateral cage, there may exist a unique "polyhedral solution," i.e., a set of internal angles that brings all of the DADs to zero, and therefore makes all of the faces planar and all of the vertices convex.

V. Solving the Systems of Equations for T=4

The Goldberg triangle for T=4, (see FIG. 3A) has one independent variable, internal angle a or b (since if you know one, you can calculate the other), and one type of DAD edge 146. We first consider the icosahedral cage. To compute the dihedral angle at the 5 gon end of the DAD edge 146, we take advantage of the labeling of angles in FIG. 3A: Using Eq. 2 we set $\alpha=108°$ and $\beta=\gamma=(360-b)/2$. Then, to compute the dihedral angle at the 6 gon end, in Eq. 2 we replace $\alpha$, $\beta$, and $\gamma$ by internal angle b. Then, we solve the zero-DAD Eq. 3 analytically, yielding $b=2\times\arccos\ [\sqrt{1/(3-2\times\cos(108°))}]$ or 116.565°. Therefore $a=(720-2\times b)/4=121.717°$. The 6 gons in this new icosahedral Goldberg polyhedron are planar, as confirmed by internal angles that sum to 720°.

Angle deficit is the difference between the sum of internal angles at a flat vertex)(360° and the sum at a vertex with curvature. In the icosahedral T=3 polyhedron (the truncated icosahedron), the 12 pentagons are responsible for all of the 720° of angle deficit required by Descartes' Rule, and each of the sixty 566 (108°, 120°,120°) vertices around the pentagons has 12° of angle deficit. By contrast, in the new icosahedral T=4 Goldberg polyhedron, the 720° of the angle deficit are distributed among all vertices, 8.565° for each of the sixty 566-vertices (108°, 121.717°, 121.717°), and 10.305° for each of the twenty 666 vertices (116.565°, 116.565°, 116.565°).

The octahedral and tetrahedral polyhedral solutions for T=4 may be computed as above, except that the internal angles in the corner faces (a in Eq. 2) are respectively 90° and 60° instead of 108°. For the octahedral T=4 polyhedron, $b=2\times\arccos(\sqrt{1/3})$ or 109.471°, so a=125.264°. For the tetrahedral T=4 polyhedron, $b=2\times\arccos\ (\sqrt{1/2})$ or 90°, so a=135°.

Thus, for T=4, for each of these three types of polyhedral symmetry, there is one Goldberg polyhedron.

VI. Mathematically Solving the Systems of Equations for T>4 for Icosahedral Polyhedra For T>4, we solve each system of n simultaneous zero-DAD equations with n variables for cages with T=7, 9, 12, and 16, and n from 2 to 4.

For example, the T=9 cage has two zero-DAD equations and two variables. Given perimeter angle a we may obtain b (i.e., b=360°−2a). Given spoke-end angle c, we may obtain d (i.e., d=240°−c). We thus choose angles a and c as the two independent variables. The two zero-DAD equations are both in the form of Eq. 3: DAD#1 is for the spoke edge from the corner 556 vertex (108°−a−a) to the 666 vertex (c−b−b), and DAD#2 is for the "post-spoke" edge from one 666 vertex (b−c−b) to another 666 vertex (a−a−d).

Figure 4A:
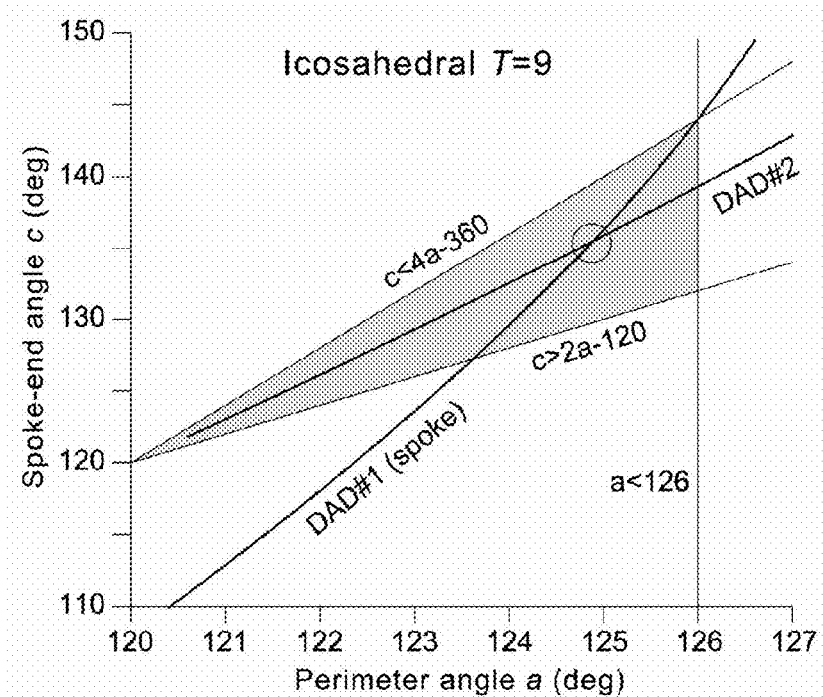
FIG. 4A shows polyhedral solutions for the icosahedral Goldberg polyhedron with T=9, wherein the circled intersection of the DAD#1 curve and the DAD#2 curve gives perimeter angle a and spoke-end angle b.

The loci of solutions for each zero-DAD equation is a curve in the a-c plane, shown in FIG. 4A. The DAD#1 curve is calculated analytically and the DAD#2 curve is calculated numerically, as discussed in more detail in Provisional Patent Application No. 61/861,960 incorporated by reference above. The two curves intersect at the circled point in FIG. 4A. The internal angles a, b, c, and d must also satisfy three inequalities, that the sums of the internal angles must be <360° for each of the three vertex types ((108°−a−a), (c−b−b), and (a−a−d)). These inequalities become bounding inequalities (a<126°, c>2a−120°, and c<4a−360°) in the graph in FIG. 4A, restricting (a,c) values for physically realizable, convex polyhedra to the shaded interior of the triangular region.

Figure 4B:
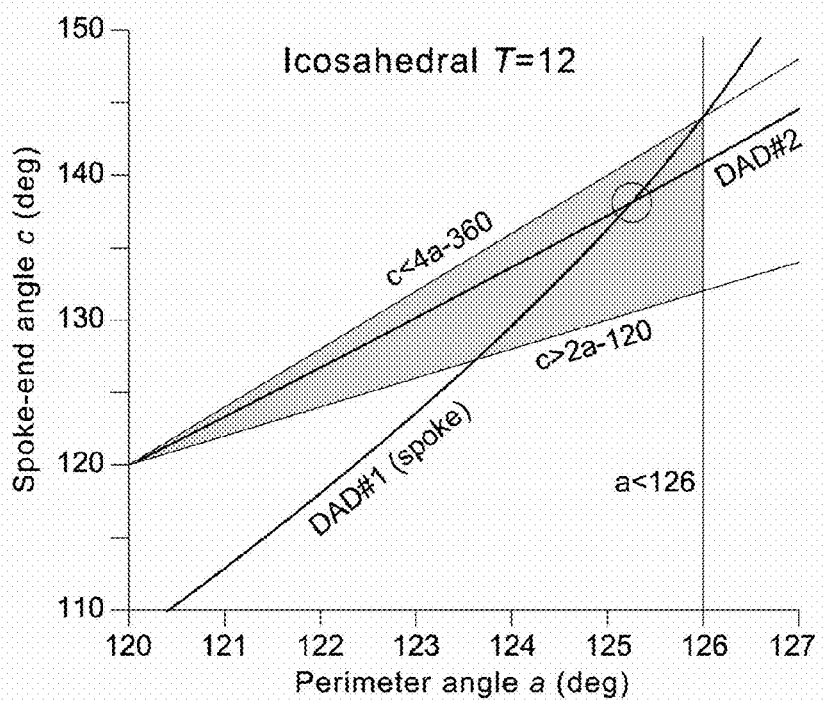
FIG. 4B shows polyhedral solutions for the icosahedral Goldberg polyhedron with T=12, wherein the circled intersection of the DAD#1 curve and the DAD#2 curve gives perimeter angle a and spoke-end angle b.

For T=12, and all achiral icosahedral cages for T>4, the spoke edge (from the 108°−a−a vertex to the c−b−b vertex) and the labeling of 6 gon #1 are the same as for T=9, so the DAD#1 curves in FIG. 4A and FIG. 4B are the same. Also, for all of achiral icosahedral polyhedra, the same bounding inequalities apply (a<126°, c>2a−120°, and c<4a−360°), giving the same shaded triangle. However, for T=12, the zero-DAD equation for DAD#2 and its corresponding curve, obtained numerically, are different from those for T=9, producing a different polyhedral solution in FIG. 4B.

For chiral icosahedral cages (e.g., with T=7), we can reduce by one the number of both independent variables and DAD equations, 3 for T=7, by setting equal all of the internal angles around the perimeter of the corner faces (5 gons), that is, by setting b=a. It follows that for chiral cages, the curve for the spoke DAD originating in the corner vertex—now 108°−a−a instead of 108°−a−b—is also given analytically. With two variables and two equations, we use numerical methods to obtain mathematically the icosahedral polyhedral solution for T=7.

VII. Solving the Systems of Equations for Icosahedral Polyhedra with Chemistry Software It will be appreciated by persons of skill in the art that alternatively the structure of the new Goldberg polyhedra disclosed herein may be conveniently calculated using a molecular modeling and computational chemistry application, such as the Spartan™ software available from Wavefunction, Inc, a California corporation having an address in Irvine, Calif. Given equal numbers of equations and variables, the polyhedral solution should be unique for each Goldberg triangle. Therefore, chemistry software that enforces planarity, as well as equilaterality, should give the same angles as the mathematical solutions above. Indeed, for all of the polyhedra for which we obtained solutions mathematically, that is, for T=4, 7, 9, 12, and 16, the internal angles agree. The chemistry software calculates a polyhedral solution slightly differently than the numerical solution described above. In particular the chemistry software finds angles within the hexagonal and pentagonal rings that reduce the dihedral angles discrepancy to zero throughout the cage.

Having confirmed the mathematical solutions and the accuracy of the solutions computed by chemistry software, we use the chemistry software to produce the icosahedral polyhedra for achiral cages with $T \leq 49$ and chiral cages with $T \leq 37$. To validate these unique solutions for these larger cages, we confirm for each that all DADs are zero, that the interior angles in 6 gons sum to 720°, that the internal angles at vertices sum to less than 360°, that polyhedral symmetry still applies, and that the cage is convex. Because of the possibility of "twist," a DAD of zero about an edge by itself does not guarantee planarity of the two faces flanking that edge. However, our mathematical solutions incorporate a sum of 720° for each 6 gon, which enforces planarity. Twist is thus precluded. Even for a cage as complex as T=37, with 6 types of 6 gons, 36 internal angles, 18 independent variables, and 18 zero-DAD equations, this method works well.

Surprisingly, the icosahedral Goldberg polyhedra, as defined herein, are nearly spherical.

The new class of equilateral convex polyhedra with polyhedral symmetry consists of a single tetrahedral polyhedron for T=4, a single octahedral polyhedron for T=4, and a countable infinity (38) of icosahedra for $T \geq 4$, one for each pair (h,k) of positive integers. Why has it taken ~400 years since Kepler discovered his two rhombic polyhedra to discover these Goldberg polyhedra? There are a number of reasons.

(1) Goldberg's method for creating cages with polyhedral symmetry (11) was not invented until the 20$^{th}$ century.

(2) DAD had to be invented as a measure of nonplanarity.

(3) It was necessary to recognize the possibility that the nonplanar 6 gons of a Goldberg cage might be made planar by bringing all of its DADs to zero.

(4) We do not believe there was any known reason to think that it was possible to do so until we learned how to count zero-DAD equations and independent variables and found equal numbers of each.

(5) For the Goldberg polyhedra with T=4, each with just n=1 zero-DAD equation and one variable, an analytic solution could be obtained with pencil and paper. For somewhat larger T, we could obtain numerical solutions from a spreadsheet. However, even this method fails for n>4 variables and simultaneous transcendental equations.

(6) Fortunately, an alternative approach based on molecular mechanics can provide equilateral polyhedral solutions for large T with large n.

The reasoning developed here, specifically counting equations and variables to determine if an equilateral polyhedral solution is possible and the techniques, particularly the use of chemistry software as a geometry engine, can be applied to other types of cage. In this way, it should be possible to obtain additional new classes of highly symmetric convex polyhedra. These polyhedra could be useful in applications requiring rigid structures that approximate spheres.

Figure 5:
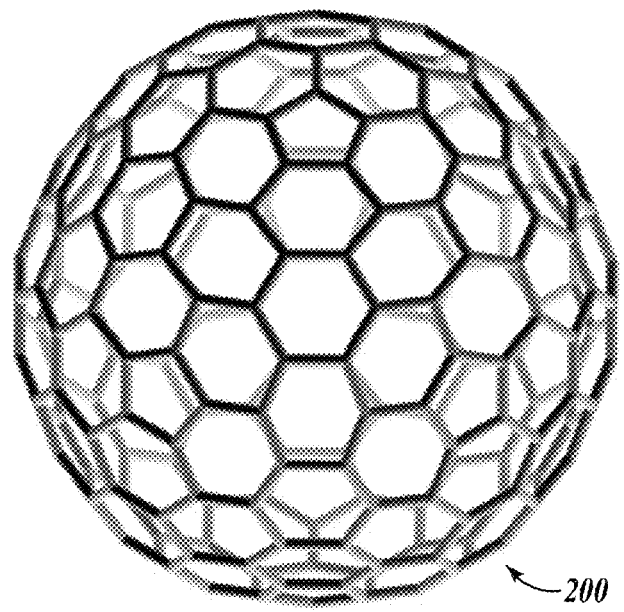
FIG. 5 is an exemplary convex equilateral polyhedral cage in accordance with the present invention.

An exemplary Goldberg polyhedral equilateral framework 200 in accordance with the present invention is shown in FIG. 5, for T=12 and (h,k)=(2,2). Adopting nomenclature from U.S. Pat. No. 2,682,235 to Richard Buckminster Fuller, which is hereby incorporated by reference in its entirety, a framework is defined to be "the frame of a structure for enclosing space, [the framework] may be skeletal, as when made of interconnected struts; or continuous as when made of interlocking or interconnected sheets or plates."

The framework 200 comprises a plurality of interconnected struts that are assembled to define a plurality of hexagonal planar (open) faces and a plurality of pentagonal planar (open) faces. Moreover, the interconnected struts of the framework 200 are equal in length. If the planar faces of the framework 200 are provided with planar panels, the assembly would define a nearly spherical polyhedron or a portion of such a polyhedron.

A "nearly spherical polyhedron" is herein expressly defined to mean a polyhedron for which there exists a center point in space wherein the longest distance from the center point to any vertex of the polyhedron is within ten percent of the shortest distance from the center point to the any other vertex of the polyhedron.

A "nearly spherical dome" is herein expressly defined to mean a dome for which there exists a center point in space wherein the longest distance from the center point to any point on the dome is within ten percent of the shortest distance from the center point to any point on the dome.

A "nearly spherical polyhedral cage" is expressly defined to mean a polyhedral cage for which there exists a center point in space wherein the longest distance from the center point to either end of any struts of the polyhedral cage is within ten percent of the shortest distance from the center point to either end of any other strut of the polyhedral cage.

The framework 200 may comprise only a portion of the nearly spherical polyhedron, for example, only the upper half, to define a substantially spherical dome or strut framework. If the framework 200 comprises a plurality of struts, preferably the struts are interchangeable. Interchangeability of the struts provides many manufacturing and assembly advantages, including lower inventory requirements, lower manufacturing costs, and simplified assembly. Such construction is particularly amenable to automated construction. For example, an automated system would not need to supply and distinguish between a plurality of struts. It is believed that the polyhedral convex framework 200 will also exhibit structural advantages, as an attractive alternative to other geodesic dome constructions, for example, those relying on a plurality of segmented great circle strut designs.

Figure 6:
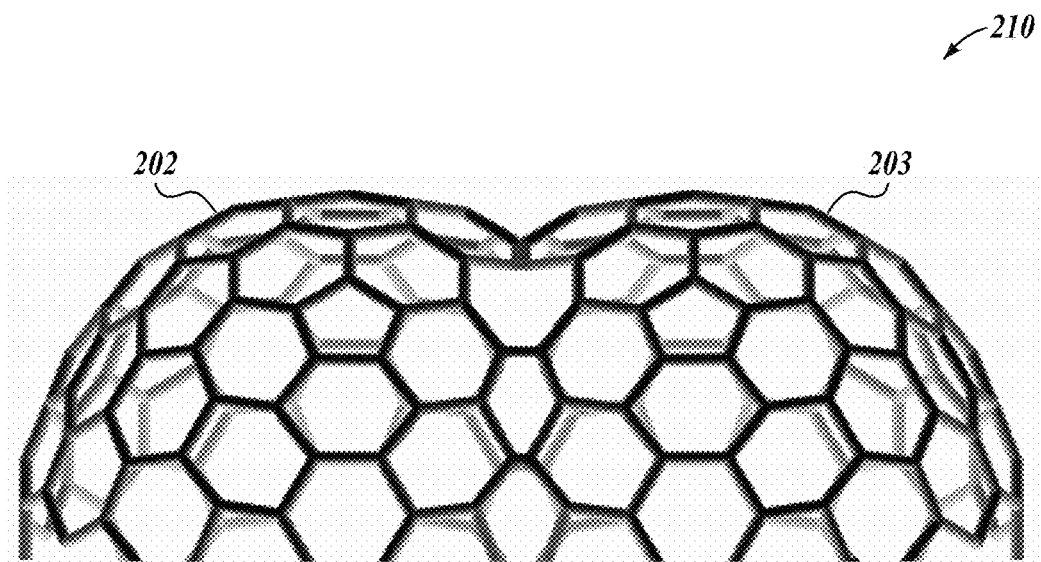
FIG. 6 is an exemplary cage in accordance with the present invention, formed by combining or joining two convex equilateral cages.

It is also contemplated that a plurality of partial cages or frameworks in accordance with the present invention may be joined with struts that may be equal in length to the struts defining the partial frameworks. For example, a substantially spherical segment comprising a portion of the framework 200, may be combined with a second segment to form a multi-dome equilateral structure. For example, FIG. 6 illustrates a framework 210 formed by combining or joining two polyhedral framework portions 202, 203. The framework portions 202, 203 may be joined, for example, with joining struts that are preferably, but not necessarily, interchangeable with the equilateral struts that form the other struts of the framework 210. Other constructions will be readily apparent to persons of ordinary skill in the art.

The framework may alternatively comprise a plurality of flat structural, hexagonal and pentagonal, equilateral plates, wherein at least some of the hexagonal plates are not equiangular.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for designing a convex equilateral cage structure comprising:
   selecting a Goldberg triangle comprising an equilateral triangle having three vertices that are each positioned on a center of a hexagon in a hexagonal tiling such that the equilateral triangle overlies a plurality of vertices from the hexagonal tiling, wherein the Goldberg triangle further comprises the plurality of vertices and each line segment connecting any two of the plurality of vertices;
   transferring the Goldberg triangle to each of the twenty faces of an icosahedron;
   adding connecting line segments that connect corresponding vertices across adjacent Goldberg triangles such that the Goldberg triangle line segments and the connecting line segments define a non-polyhedral cage, wherein the non-polyhedral cage comprises only trivalent vertices; and
   transforming the non-polyhedral cage such that the transformed cage comprises a plurality of hexagons and a plurality of pentagons, and the transformed cage is equilateral and convex.

2. The method of claim 1, wherein the step of transforming the non-polyhedral cage comprises solving for interior angles in the plurality of hexagons that produce a zero dihedral angle discrepancy throughout the transformed cage.

3. The method of claim 2, wherein the interior angles in the plurality of hexagons are solved for by identifying all independent interior angles in the non-polyhedral cage, and determining the independent interior angles by solving a system of equations that enforce planarity in the plurality of hexagons.

4. The method of claim 3, wherein the system of equations that enforce planarity in the plurality of hexagons solve for interior angles that produce zero dihedral angle discrepancy throughout the transformed cage.

5. The method of claim 2, wherein the interior angles in the plurality of hexagons are solved for by finding a set of interior angles within each of the plurality of hexagons that zeroes the dihedral angles within that hexagon.

6. The method of claim 1, wherein the plurality of pentagons are regular pentagons.

7. The method of claim 1, wherein the Goldberg triangles comprise at least four vertices from the hexagonal tiling.

8. The method of claim 1, further comprising constructing the convex equilateral cage structure by interconnecting a plurality of elongate struts to form the plurality of hexagons and pentagons.

9. The method of claim 8, wherein the plurality of elongate struts are interchangeable.

10. The method of claim 1, further comprising constructing the convex equilateral cage structure by interconnecting a plurality of planar members that define the plurality of hexagons and pentagons.

11. The method of claim 1, wherein the convex equilateral cage structure comprises a dome-shaped structure.

12. The method of claim 1, wherein the convex equilateral cage structure has tetrahedral, octahedral, and icosahedral symmetry.

13. A method for designing a nearly spherical equilateral cage comprising:
   selecting a Goldberg triangle constructed as an equilateral triangle having three vertices that are each positioned on a center of a hexagon in a hexagonal tiling such that the equilateral triangle overlies a plurality of vertices from the hexagonal tiling, wherein the Goldberg triangle comprises the plurality of vertices and each segment from the hexagonal tiling connecting any two of the plurality of vertices;
   forming an icosahedron comprising twenty of the selected Goldberg triangle;
   forming a preliminary cage by adding segments that connect vertices across adjacent faces of the icosahedron, wherein the preliminary cage comprises a plurality of hexagons and a plurality of pentagons; and
   transforming the preliminary cage to define a nearly spherical equilateral cage by setting all of the segments to the same length, and setting interior angles in the plurality of hexagons to angles that null dihedral angle discrepancies throughout the transformed cage.

14. The method of claim 13, wherein the selected Goldberg triangle is sized such that it includes at least four vertices from the hexagonal tiling.

15. The method of claim 13, wherein the interior angles in the plurality of hexagons that null the dihedral angle discrepancy throughout the transformed cage are determined by identifying all independent interior angles in the plurality of hexagons, and solving a system of equations that enforce planarity in the plurality of hexagons.

* * * * *